US012641480B2

(12) United States Patent
Wu

(10) Patent No.: US 12,641,480 B2
(45) Date of Patent: May 26, 2026

(54) DATA TRANSMISSION PROCESSING METHOD AND APPARATUS, AND DEVICE

(71) Applicant: VIVO MOBILE COMMUNICATION CO., LTD., Dongguan (CN)

(72) Inventor: Yumin Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 500 days.

(21) Appl. No.: 18/107,500

(22) Filed: Feb. 8, 2023

(65) Prior Publication Data

US 2023/0189061 A1 Jun. 15, 2023

Related U.S. Application Data

(63) Continuation of application No. PCT/CN2021/112186, filed on Aug. 12, 2021.

(30) Foreign Application Priority Data

Aug. 13, 2020 (CN) .......................... 202010814178.5

(51) Int. Cl.
*H04W 28/02* (2009.01)
(52) U.S. Cl.
CPC ................................ *H04W 28/0289* (2013.01)
(58) Field of Classification Search
CPC ............. H04W 28/0289; H04W 24/02; H04W 28/0278; H04W 72/04; H04W 72/54; H04W 72/53
See application file for complete search history.

(56) References Cited

U.S. PATENT DOCUMENTS

| | | | |
|---|---|---|---|
| 2017/0171837 A1 | 6/2017 | Chen et al. | |
| 2018/0027565 A1 | 1/2018 | Kwon | |
| 2021/0360738 A1* | 11/2021 | Shan | H04W 68/005 |

FOREIGN PATENT DOCUMENTS

| | | |
|---|---|---|
| CN | 102857319 A | 1/2013 |
| CN | 106576079 A | 4/2017 |
| CN | 109691209 A | 4/2019 |
| CN | 110519856 A | 11/2019 |
| CN | 110547024 A | 12/2019 |
| CN | 111132371 A | 5/2020 |

OTHER PUBLICATIONS

International Search Report issued in corresponding International Application No. PCT/CN2021/112186, mailed Nov. 15, 2021, 4 pages.
Intel Corporation, "On Type 1 D2D Discovery Resource Allocation", 3GPP TSG RAN WG1 Meeting #76bis R1-141162, Apr. 2014, 5 pages.

* cited by examiner

*Primary Examiner* — Khoa Huynh
(74) *Attorney, Agent, or Firm* — IPX PLLC

(57) ABSTRACT

A data transmission processing method and apparatus, and a device are provided. The method includes: obtaining configuration information for small data transmission, where the configuration information includes: a quantity N of uplink transmission resources, and N is greater than 1; and determining whether to trigger small data transmission based on the configuration information.

18 Claims, 5 Drawing Sheets

Network side device 11 11

Terminal

Terminal

Start

Obtain configuration information for small data transmission, where the configuration information includes: a quantity N of uplink transmission resources, and N is greater than 1 — 201

Determine whether to trigger small data transmission based on the configuration information — 202

End

DATA TRANSMISSION PROCESSING METHOD AND APPARATUS, AND DEVICE

CROSS-REFERENCE TO RELATED APPLICATIONS

This application is a continuation of International Application No. PCT/CN2021/112186, filed on Aug. 12, 2021, which claims priority to Chinese Patent Application No. 202010814178.5, filed on Aug. 13, 2020. The entire contents of each of the above-identified applications are expressly incorporated herein by reference.

TECHNICAL FIELD

This application relates to the field of communications technologies, and in particular, to a data transmission processing method and apparatus, and a device.

BACKGROUND

In the Small Data Transmission (SDT) technology, the terminal, in a case of the IDLE state or the INACTIVE state, can directly send data to the network side device.

However, there is only one small data transmission resource currently configured. Therefore, in a scenario where SDT is required for a large amount of data, data transmission is inevitably delayed. As a result, the data cannot be delivered in time.

SUMMARY

Embodiments of this application are intended to provide a data transmission processing method and apparatus, and a device.

According to a first aspect, an embodiment of this application provides a data transmission processing method, applied to a terminal and including:

obtaining configuration information for small data transmission, where the configuration information includes: a quantity N of uplink transmission resources, and N is greater than 1; and determining whether to trigger small data transmission based on the configuration information.

According to a second aspect, an embodiment of this application provides a data transmission processing method, applied to a network side device and including:

sending configuration information of small data transmission, where the configuration information includes: a quantity N of uplink transmission resources, and N is greater than 1.

According to a third aspect, an embodiment of this application further provides a data transmission processing apparatus, including:

an obtaining module, configured to obtain configuration information for small data transmission, where the configuration information includes: a quantity N of uplink transmission resources, and N is greater than 1; and a first processing module, configured to determine whether to trigger small data transmission based on the configuration information.

According to a fourth aspect, an embodiment of this application further provides a data transmission processing apparatus, including:

a sending module, configured to send configuration information of small data transmission, where the configuration information includes: a quantity N of uplink transmission resources, and N is greater than 1.

According to a fifth aspect, an embodiment of this application further provides a communications device. The communications device includes a processor, a memory, and a program or an instruction stored in the memory and executable on the processor, where when the program or the instruction is executed by the processor, steps of the method according to the first aspect or the second aspect are implemented.

According to a sixth aspect, an embodiment of this application further provides a readable storage medium, where the readable storage medium stores a program or an instruction, and when the program or the instruction is executed by a processor, steps of the method according to the first aspect or the second aspect are implemented.

According to a seventh aspect, an embodiment of this application provides a chip. The chip includes a processor and a communications interface, the communications interface is coupled to the processor, and the processor is configured to run a program or an instruction, to implement the method according to the first aspect, or the method according to the second aspect.

According to an eighth aspect, an embodiment of this application provides a program product, the program product is stored in a non-volatile storage medium, and the program product is executed by at least one processor to implement steps of the method according to the first aspect or the second aspect.

DETAILED DESCRIPTION

The following describes the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The terms "first," "second," and the like in this specification and claims of this application are used to distinguish between similar objects instead of describing a specific order or sequence. It should be understood that the data used in this way is interchangeable in appropriate circumstances so that the embodiments of this application described can be implemented in other orders than the order illustrated or described herein. In addition, "and/or" in the specification and claims represents at least one of connected objects. Symbol "/" in this specification generally represents an "or" relationship between associated objects.

It should be noted that the technology described in the embodiments of this application is not limited to a Long Term Evolution (LTE)/LTE-Advanced (LTE-A) system, and may also be used in various wireless communications systems, for example, Code Division Multiple Access (CDMA), Time Division Multiple Access (TDMA), Frequency Division Multiple Access (FDMA), Orthogonal Frequency Division Multiple Access (OFDMA), Single-Carrier Frequency-Division Multiple Access (SC-FDMA), and another system. The terms "system" and "network" in the embodiments of this application may be used interchangeably. The technologies described can be applied to both the systems and the radio technologies mentioned above as well as to other systems and radio technologies. However, a New Radio (NR) system is described below as an example, and the term NR is used in most of the descriptions, although these technologies can also be used in an application other than an application of the NR system, for example, a 6th Generation (6G) communications system.

Figure 1:
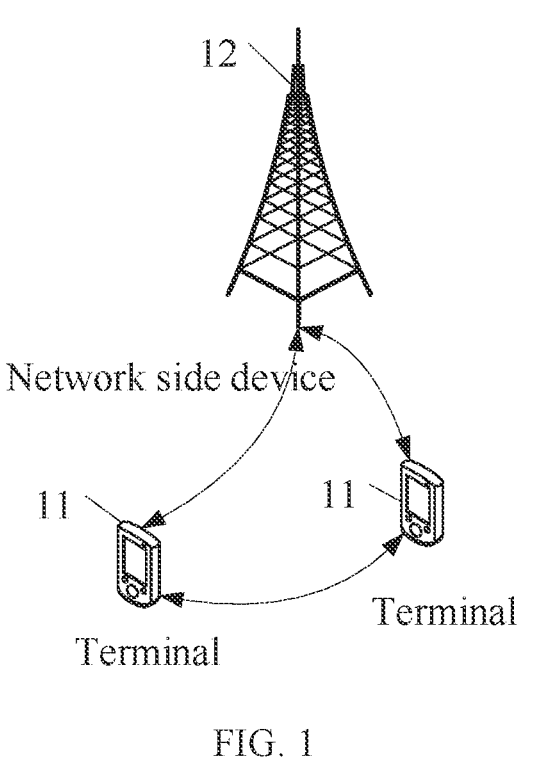
FIG. 1 is a block diagram of a wireless communications system.

FIG. 1 is a block diagram of a wireless communications system to which embodiments of this application can be applied. The wireless communications system includes a terminal 11 and a network side device 12. The terminal 11 may also be referred to as a terminal device or User Equipment (UE). The terminal 11 may be a terminal side device such as a mobile phone, a tablet personal computer, a laptop computer, a notebook computer, a Personal Digital Assistant (PDA), a palmtop computer, a netbook, an Ultra-Mobile Personal Computer (UMPC), a Mobile Internet Device (MID), a wearable device, Vehicle User Equipment (VUE), or Pedestrian User Equipment (PUE). The wearable device includes a bracelet, a headset, glasses, or the like. It should be noted that a specific type of the terminal 11 is not limited in the embodiments of this application. The network side device 12 may be a base station or a core network. The base station may be referred to as a NodeB, an evolved Node B, an access point, a Base Transceiver Station (BTS), a radio base station, a radio transceiver, a Basic Service Set (BSS), an Extended Service Set (ESS), a home NodeB, a home evolved NodeB, a WLAN access point, a WiFi node, a Transmitting Receiving Point (TRP), or another suitable term in the field provided that a same technical effect is achieved. The base station is not limited to a specific technical term. It should be noted that, in the embodiments of this application, only a base station in an NR system is used as an example, but a specific type of the base station is not limited.

With reference to the accompanying drawings, the data transmission processing method provided in the embodiments of this application is described in detail by using specific embodiments and application scenarios.

The method of the embodiments of this application is applied to a terminal, which may also be referred to as User Equipment (UE). The UE may refer to an access terminal, a subscriber unit, a subscriber station, a mobile site, a mobile station, a remote station, a remote terminal, a mobile device, a user terminal, a wireless communications device, a user agent, or a user apparatus. The terminal may be a cellular phone, a cordless phone, a Session Initiation Protocol (SIP) phone, a Wireless Local Loop (WLL) station, a Personal Digital Assistant (PDA), a hand-held device having a wireless communication function, a computing device or another processing device connected to a wireless modem, an in-vehicle device, or a wearable device.

Figure 2:
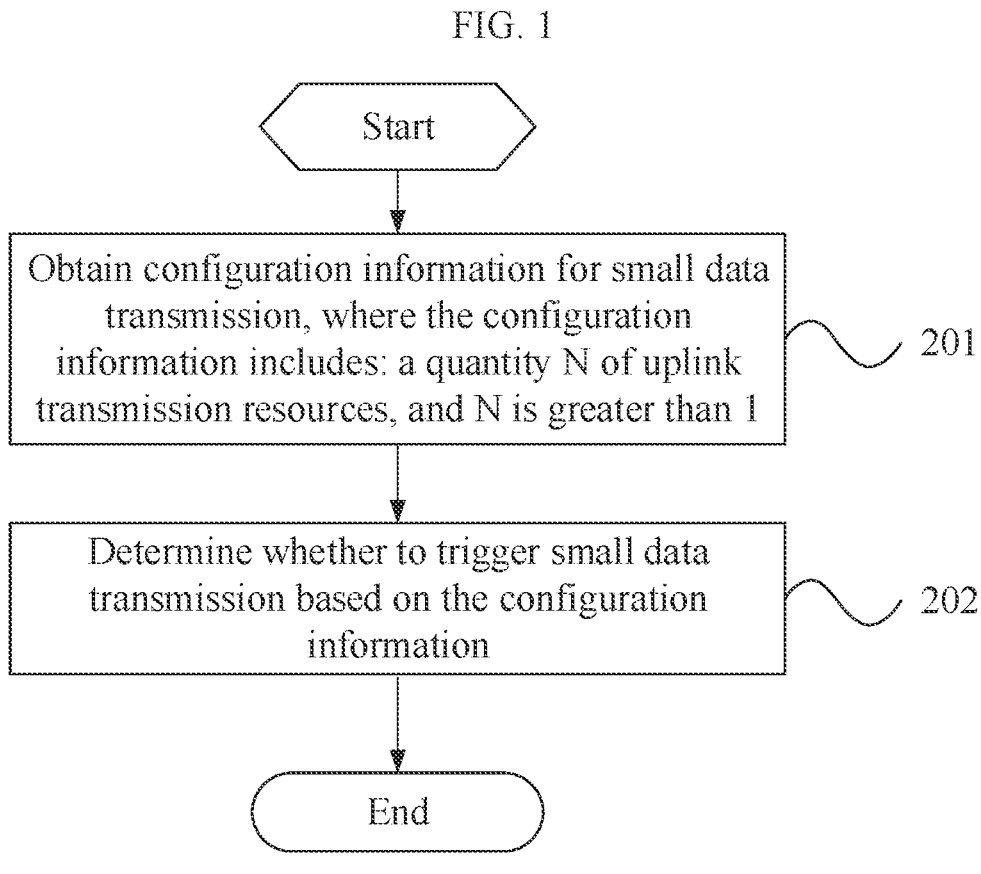
FIG. 2 is a flowchart of a method applied to a terminal according to an embodiment of this application.

As shown in FIG. 2, an embodiment of this application provides a data transmission processing method. The method is applied to a terminal and includes the following steps.

Step 201. Obtain configuration information for small data transmission, where the configuration information includes: a quantity N of uplink transmission resources, and N is greater than 1.

The configuration information herein is used for small data transmission, and includes the quantity N of uplink transmission resources, and N is greater than 1, indicating that the terminal, namely, UE may perform small data transmission by using a plurality of uplink transmission resources.

Step 202. Determine whether to trigger small data transmission based on the configuration information.

In this step, after the configuration information is obtained in step 201, the small data transmission may be triggered or not triggered based on the configuration information.

In this way, according to step 201 and step 202, after the terminal obtains the configuration information of small data transmission, the small data transmission can be triggered or not triggered based on the quantity N of uplink transmission resources in the configuration information. However, because N is greater than 1, the small data transmission may be performed by using a plurality of uplink transmission resources, thus supporting a larger data transmission amount, meeting data transmission requirements, and reducing the data transmission delay.

In addition, the configuration of N can also avoid data transmission from occupying too many resources.

In some implementations, the configuration information of small data transmission may be predefined (for example, agreed by a protocol), pre-configured, or configured by the network side device. For example, if the network side device configures a dedicated Physical Uplink Shared CHannel (PUSCH) resource for the UE to send data of a Data Radio Bearer (DRB)-1, the network side device configures configuration information of SDT for the INACTIVE UE in a Radio Resource Control (RRC) release message, and the configuration information includes N=2, that is, the UE may use two dedicated PUSCH resources for small data transmission.

In addition, in this embodiment, information such as time domain positions or frequency domain positions of the N uplink transmission resources may also be indicated by the configuration information of SDT, such as configuring an uplink transmission resource (pur-Config) for the INACTIVE UE in the RRC Release message. In some implementations, if information about the uplink transmission resource is predefined, information about the N uplink transmission resources may also be determined by using a value of N included in the configuration information of SDT, such as any N uplink transmission resources, first N uplink transmission resources, last N uplink transmission resources, or the like.

It should be learned that small data transmission is performed through one of the following:

a message 3 (Msg 3) of a 4-step random access procedure for initial access;

a message A (Msg A) of a 2-step random access procedure for initial access; and a dedicated PUSCH resource configured by the network.

In some implementations, the configuration information further includes:

a data amount threshold corresponding to N uplink transmission resources, where the data amount threshold is a total data amount allowed to be transmitted by using the N uplink transmission resources, and/or a data amount allowed to be transmitted by using each of the N uplink transmission resources.

Therefore, by configuring the data amount threshold corresponding to the N uplink transmission resources, namely, the total data amount allowed to be transmitted by using the N uplink transmission resources, and/or the data amount allowed to be transmitted by using each of the N uplink transmission resources, the ability of small data transmission can be learned, and it can be determined more effectively whether the data to be transmitted can trigger small data transmission. The data amount may be a Transport Block Size (TBS).

For example, in the foregoing example, in addition to N=2, the configuration information of SDT also includes the total data amount allowed to be transmitted by using the two uplink transmission resources. It can be learned that the UE may use the total data amount transmitted by using the two dedicated PUSCH resources for small data transmission. If the configuration information of SDT also includes the data amount allowed to be transmitted by using each uplink transmission resource, the data amount allowed to be transmitted by using each dedicated PUSCH resource may also be learned when these two dedicated PUSCH resources are used.

In some implementations, step 202 includes:

determining whether first data meets a first preset condition based on the configuration information, and triggering small data transmission in a case of meeting the first preset condition; not triggering small data transmission in a case of not meeting the first preset condition, where the first data is target data of this small data transmission; and the first preset condition includes at least one of the following:

a quantity M of uplink transmission resources used for the first data is less than or equal to N;

a total data amount of the first data is less than or equal to the total data amount allowed to be transmitted by using the N uplink transmission resources; and in the M uplink transmission resources used for the first data, a data amount of each uplink transmission resource is less than or equal to the data amount allowed to be transmitted by using each of the N uplink transmission resources.

The first preset condition herein is determined based on the configuration information of SDT obtained in step 201, and corresponding to the configuration of N, the first preset condition limits the quantity M of uplink transmission resources used for the first data; corresponding to the configuration of the total data amount allowed to be transmitted by using the N uplink transmission resources, the first preset condition limits the total data amount of the first data; and corresponding to the configuration of the data amount allowed to be transmitted by using each of the N uplink transmission resources, the first preset condition limits the data amount of each of the M uplink transmission resources used for the first data.

Therefore, for the target data (namely, the first data) of this small data transmission, it is necessary to determine, based on the configuration information obtained in step 201, whether the first data meets the corresponding first preset condition, so as to trigger or not trigger the small data transmission.

For example, when the UE has two data packets to be sent, and the two data packets need to be sent by using two uplink transmission resources (namely, M=2); the network side device configures three uplink transmission resources (namely, N=3), the UE may trigger small data transmission.

For another example, when a total of 100 bytes of data is to be sent by the UE; the network side configures three uplink transmission resources (namely, N=3), and a total of 120 bytes of data is allowed to be transmitted, the UE may trigger small data transmission.

For still another example, when the UE has two data packets to be sent, the two data packets need to be sent by using two uplink transmission resources (namely, M=2), and each uplink transmission resource includes 20 bytes of data; the network side device configures three uplink transmission resources (namely, N=3), and each uplink transmission resource allows 50 bytes of data to be sent, the UE may trigger small data transmission.

Considering whether a same piece of data (such as packet data and a Packet Data Convergence Protocol Protocol Data Unit (PDCP PDU)) can be transmitted on different resources may affect the quantity of used uplink transmission resources and calculation of data amount, in some implementations, the first data includes data transmitted in segments on the M uplink transmission resources and/or data not transmitted in segments on the M uplink transmission resources.

In this way, when it is determined whether the first preset condition is met, it can be processed based on whether the data can be transmitted in segments on a plurality of uplink transmission resources. Segmentation herein refers to sending a data packet on a plurality of resources.

If the first data includes the data transmitted in segments on the M uplink transmission resources, the quantity M of the uplink transmission resources used for the first data, the total data amount, and the data amount of each uplink transmission resource can be calculated based on segmented transmission of data; if the first data includes the data not transmitted in segments on the M uplink transmission resources, the quantity M of the uplink transmission resources used for the first data, the total data amount, and the data amount of each uplink transmission resource can be calculated based on non-segment transmission of data; and if the first data includes the data transmitted in segments on the M uplink transmission resources and the data not transmitted in segments on the M uplink transmission resources, the quantity M of the uplink transmission resources used for the first data, the total data amount, and the data amount of each uplink transmission resource are calculated separately based on different data before being determined.

Generally, in addition to the valid data (such as the application layer data packet service Data Adaptation Protocol (SDAP) Service Data Unit (SDU)), data transmission also includes a header, and there may also be control signaling. Further, for a packet segment, there may be additional headers after the segment. In some implementations, additional headers may be increased once for each segment: the Radio Link Control (RLC) header and the Media Access Control (MAC) header.

Therefore, in some implementations, the total data amount of the first data includes valid data, or the valid data and at least one of the following:

a header of original data;

a header of segmented data; and control signaling.

In some implementations, in the M uplink transmission resources used for the first data, a data amount of each uplink transmission resource includes valid data, or the valid data and at least one of the following:

a header of original data;

a header of segmented data; and control signaling.

In this way, the total data amount of the first data and the data amount of each of the M uplink transmission resources used for the first data may be calculated only for the valid data, or for the valid data and other information, where the other information includes at least one of the following: a header of original data; a header of segmented data; and control signaling.

The valid data includes data of a DRB and/or a Signaling Radio Bearer (SRB).

The control signaling includes at least one of Medium Access Control-Control Element (MAC CE) signaling, an RLC control packet, a PDCP control packet, and an SDAP control packet.

In some implementations, the header includes at least one of the following:

a Service Data Adaptation Protocol (SDAP) header;

a Packet Data Convergence Protocol (PDCP) header;

a Radio Link Control (RLC) header; and a Media Access Control (MAC) header.

In some implementations, it can also be other headers other than the foregoing headers, which are not listed herein.

In some implementations, the control signaling includes at least one of the following:

a Buffer Status Report (BSR); and a Power Headroom Report (PHR).

For example, the MAC CE signaling includes MAC CE signaling of the BSR, which is used to assist the network side device to determine whether the terminal is in a connected state; and the MAC CE signaling includes MAC CE signaling of the PHR, which is used to assist the network side device to adjust an uplink transmit power. In some implementations, information items included in the control signaling are not limited to the BSR and/or the PHR, but may also include other information items, which are not listed herein.

It should also be learned that, based on the usage requirements, in the process of small data transmission, there may be new data to be transmitted. Therefore, in this embodiment, after step 202, the method further includes:

in a case of new data to be transmitted, determining whether second data meets a second preset condition, and in a case that the second preset condition is met, continuing small data transmission; in a case that the second preset condition is not met, performing at least one of the following:

stopping small data transmission after the first data is transmitted; and triggering connection establishment or recovery, where the second preset condition includes at least one of the following:

a quantity K of uplink transmission resources used for the second data is less than or equal to N;

a total data amount of the second data is less than or equal to the total data amount allowed to be transmitted by using the N uplink transmission resources; and in the K uplink transmission resources used for the second data, a data amount of each uplink transmission resource is less than or equal to the data amount allowed to be transmitted by using each of the N uplink transmission resources.

In this way, after small data transmission of the first data is triggered, the small data transmission is redetermined to be triggered with the second data as a determining object in a case of new data to be transmitted: in a case that the second preset condition is met, continuing small data transmission; in a case that the second preset condition is not met, performing at least one of the following: stopping small data transmission after the first data is transmitted; and triggering connection establishment or recovery.

The second preset condition is also determined based on the configuration information of SDT obtained in step 201, and corresponding to the configuration of N, the second preset condition limits the quantity K of uplink transmission resources used for the second data; corresponding to the configuration of the total data amount allowed to be transmitted by using the N uplink transmission resources, the second preset condition limits the total data amount of the second data; and corresponding to the configuration of the data amount allowed to be transmitted by using each of the N uplink transmission resources, the second preset condition limits the data amount of each of the K uplink transmission resources used for the second data.

In some implementations, the second data is the first data and the new data; or the second data is remaining data not transmitted in the first data and the new data.

That is, the second data including the first data and the new data is used as the basis for determining; or the second data including the new data and the data not transmitted in the first data is used as the basis for determining.

The second data including the first data and new data is used as an example:

a. If the UE has two data packets to be sent, and the two data packets need to be sent by using two uplink transmission resources (namely, M=2); the network side device configures three uplink transmission resources (namely, N=3), the UE triggers small data transmission. Then, one new data packet arrives to be sent, and there are three data packets to be sent (namely, K=3) in total. Because K is less than N, the UE may continue the small data transmission.

b. If a total of 100 bytes of data is to be sent by the UE; the network side configures three uplink transmission resources (namely, N=3), and a total of 120 bytes of data is allowed to be transmitted, the UE triggers small data transmission. Then, as 10 bytes of new data arrives, the total data amount is 110 bytes, which is less than 120 bytes, and the UE may continue the small data transmission.

c. If the UE has two data packets to be sent, the two data packets need to be sent by using two uplink transmission resources (namely, M=2), and each uplink transmission resource includes 20 bytes of data; the network side device configures three uplink transmission resources (namely, N=3), and each uplink transmission resource allows 50 bytes of data to be sent, the UE triggers small data transmission. Then, one new data packet arrives to be sent with a data amount of 10 bytes, and a total of two uplink transmission resources (namely, M=2) are required for sending. The data amount of each uplink transmission resource is 25 bytes, less than 50 bytes, so the UE may continue the small data transmission.

The second data including remaining data not transmitted in the first data and the new data is used as an example:

a. If the UE has two data packets to be sent, and the two data packets need to be sent by using two uplink transmission resources (namely, M=2); the network side device configures three uplink transmission resources (namely, N=3), the UE triggers small data transmission. After one data packet is sent by using one uplink transmission resource, one new data packet arrives to be sent, and the remaining two data packets (namely, K=2) need to be sent by using two uplink transmission resources. Because N−1=2, the UE may continue the small data transmission.

b. If a total of 100 bytes of data is to be sent by the UE; the network side configures three uplink transmission resources (namely, N=3), and a total of 120 bytes of data is allowed to be transmitted, the UE triggers small data transmission. After 50 bytes of data is sent by using one uplink transmission resource, 10 bytes of new data arrives, and the total amount of remaining data is 60 bytes. Because 120−50=60, the UE may continue the small data transmission.

c. If the UE has two data packets to be sent, the two data packets need to be sent by using two uplink transmission resources (namely, M=2), and each uplink transmission resource includes 20 bytes of data; the network side device configures three uplink transmission resources (namely, N=3), and each uplink transmission resource allows 50 bytes of data to be sent, the UE triggers small data transmission. After a 20-byte data packet is sent, one new data packet arrives to be sent with a data amount of 20 bytes, and there are two remaining data packets, and the data amount of each uplink transmission resource is less than 50 bytes, so the UE may continue the small data transmission.

The following descriptions are provided with reference to a specific embodiment:

Step 1: The network side device configures a small data sending process, that is, a small data transmission process, for the UE. (For example, the network side Configures pur-Config for the INACTIVE UE in the RRC Release message, the configuration includes a dedicated PUSCH uplink sending resource for the INACTIVE UE to send uplink data, and the data amount (such as a Transport Block Size (TBS)) that each PUSCH uplink sending resource can accommodate.)

The "small data sending process" includes at least one of the following:

a Msg 3 of 4-step random access procedure for initial access;

a Msg A of 2-step random access procedure for initial access; and a dedicated uplink PUSCH resource configured by the network.

In some implementations, the network side device configures or agrees in a protocol that N uplink sending resources may be used in the small data sending process of the UE. N is an integer greater than 1. (For example, the network side device configures the dedicated uplink PUSCH resource for the UE to send data of the DRB-1, and configures that two dedicated uplink PUSCH resources may be used in the small data sending process of the UE.)

In some implementations, the network side device configures a threshold value of the data amount sent by the UE (the data amount threshold corresponding to the N uplink sending resources (namely, uplink transmission resources)) when the UE uses N uplink sending resources for small data sending. (For example, the network side configures the dedicated uplink PUSCH resource for the UE to send data of the DRB-1, configures that two dedicated uplink PUSCH resources may be used in the small data sending process of the UE, and configures the total data amount sent by using the two dedicated uplink PUSCH resources.)

The "threshold value of the sent data amount" includes at least one of the following:

a threshold value of a total data amount sent by using the N uplink sending resources; and a threshold value of a data amount sent by using each of the N uplink sending resources.

Step 2: Based on the configuration information in step 1, the UE determines that conditions for the small data sending process include at least one of the following:

Condition 1: A quantity of uplink resources used by the UE in the "small data sending process" is M, where M is less than or equal to N. (For example, if the UE has two data packets to send, the two data packets need to be sent by using two uplink sending resources, and the network side device allows the UE to use three uplink sending resources, the UE may adopt the "small data sending process".)

Condition 2: A total amount of uplink data sent by the UE in the "small data sending process" is less than or equal to the data amount allowed to be sent by using the N uplink sending resources. (For example, if a total of 100 bytes of data is to be sent by the UE, and the total data amount allowed to be sent by using three uplink sending resources is 120 bytes, the UE may adopt the "small data sending process".)

Condition 3: A quantity of uplink resources used by the UE in the "small data sending process" is M, and each amount of uplink data sent by the UE is less than or equal to the data amount allowed to be sent by using each of the N uplink sending resources. (For example, if the UE has two data packets to send, the two data packets need to be sent by using two uplink sending resources with an amount of sending uplink data of 20 bytes, and the network side device allows the UE to use three uplink sending resources with a data amount allowed to be sent by using each uplink sending resource of 50 bytes, the UE may adopt the "small data sending process".)

For Condition 1, it can be further defined that the uplink data sent by using the M uplink resources can (or cannot) be segmented. (The segmentation indicates that after an uplink data packet (for example, a PDCP PDU) is segmented in single uplink sending, only part of the data in the data packet is sent in the single uplink sending. That is, the UE sends one data packet on a plurality of uplink sending resources.)

For Condition 2, it can be further defined that the "total amount of sending uplink data" is calculated in a case that segmentation can (or cannot) be performed. (For example, for the data packet 1, if the segmentation is performed once, additional RLC and MAC headers are included once, and the total amount of sending uplink data is increased by additional RLC and MAC headers once.)

For Condition 3, it can be further defined that each uplink data can (or cannot) be segmented.

For Condition 2 and Condition 3, it can be further defined that calculation of the data amount includes at least a data amount of data without a header (for example, only including the SDAP SDU).

In some implementations, for Condition 2 and Condition 3, the calculation of the data amount may further include at least one of the following headers:

an SDAP header;

a PDCP header;

an RLC header; and a MAC header.

In some implementations, for Condition 2 and Condition 3, the calculation of the data amount may further include a data amount of a specified MAC CE that can be sent (or triggered for sending).

The "specified MAC CE that can be sent (or triggered for sending)" include at least one of the following:

a BSR; and a PHR.

Step 3: When the UE determines to use the small data sending process with N uplink sending resources, In the small data sending process, if new data arrives at the UE, the conditions for the UE to determine whether to continue to use "the small data sending process with N uplink sending resources" include any of the following:

If the newly arrived data and "data before triggering the small data sending process" still meet the conditions in step 2, the UE continues to use the "small data sending process". (As Condition 1: for example, if the UE has two data packets to send, the two data packets need to be sent by using two uplink sending resources, and the network side device allows the UE to use three uplink sending resources, one new data packet arrives after the UE adopts the "small data sending process," and three data packets need to be sent by using three uplink sending resources, then the UE continues to adopt the "small data sending process".) (As Condition 2: for example, if a total of 100 bytes of data is to be sent by the UE, and the total data amount allowed to be sent by using three uplink sending resources is 120 bytes, then 10 bytes of data arrives after the UE adopts the "small data sending process," and the total data amount is 110 bytes, then the UE continues to adopt the "small data sending process".) (As Condition 3: for example, if the UE has two data packets to send, these two data packets need to be sent by using two uplink sending resources with an amount of sending uplink data of 20 bytes, and the network side device allows the UE to use three uplink sending resources with a data amount allowed to be sent by using each uplink sending resource of 50 bytes, one new data packet arrives after the UE adopts the "small data sending process," and the three data packets need to be sent by using three uplink sending resources with an amount of sending uplink data of 20 bytes, then the UE continues to adopt the "small data sending process".)

For the remaining sending resources of the N uplink sending resources, if the newly arrived data and data that is not sent still meet the conditions in step 2, the UE continues to use the "small data sending process". (As Condition 1: for example, if the UE has two data packets to send, the two data packets need to be sent by using two uplink sending resources, and the network side device allows the UE to use three uplink sending resources, after adopting the "small data sending process," the UE uses one uplink resource to send one data packet, and one new data packet arrives, then the remaining two data packets need to be sent by using two uplink sending resources (equal to (3−1=2) remaining allowed sending times), then the UE continues to adopt the "small data sending process".) (As Condition 2: for example, if a total of 100 bytes of data is to be sent by the UE, and the total data amount allowed to be sent by using three uplink sending resources is 120 bytes, after adopting the "small data sending process," the data amount that is sent by the UE by using one uplink sending resource is 50 bytes, and the newly arrived data is 10 bytes, so a total amount of remaining data is 60 bytes (less than (120−50=70) bytes of remaining data amount allowed to be sent), then the UE continues to adopt the "small data sending process".) (As Condition 3: for example, if the UE has two data packets to send, these two data packets need to be sent by using two uplink sending resources with an amount of sending uplink data of 20 bytes, and the network side device allows the UE to use three uplink sending resources with a data amount allowed to be sent by using each uplink sending resource of 50 bytes, after adopting the "small data sending process," the UE sends a 20-byte data packet, and as a new 20-byte data packet arrives, the remaining two data packets need to be sent by using two uplink sending resources with an amount of sending uplink data of 20 bytes (equal to the remaining two sending times, and the data amount sent each time is less than the amount allowed to be sent), then the UE continues to adopt the "small data sending process".)

If the UE determines not to use the "small data sending process with N uplink sending resources," the behavior of the UE includes at least one of the following:

the UE stops the small data sending process after sending the previous data; and the UE triggers a connection establishment or recovery process. (For example, the UE triggers a common random access procedure for connection establishment or recovery. In this random access procedure, the UE does not send the data in the DRB.)

In conclusion, according to the method in the embodiments of this application, after the configuration information of small data transmission is obtained, the small data transmission can be triggered or not triggered based on the quantity N of uplink transmission resources in the configuration information. However, because N is greater than 1, the small data transmission may be performed by using a plurality of uplink transmission resources, thus supporting a larger data transmission amount, meeting data transmission requirements, and reducing the data transmission delay.

Figure 3:
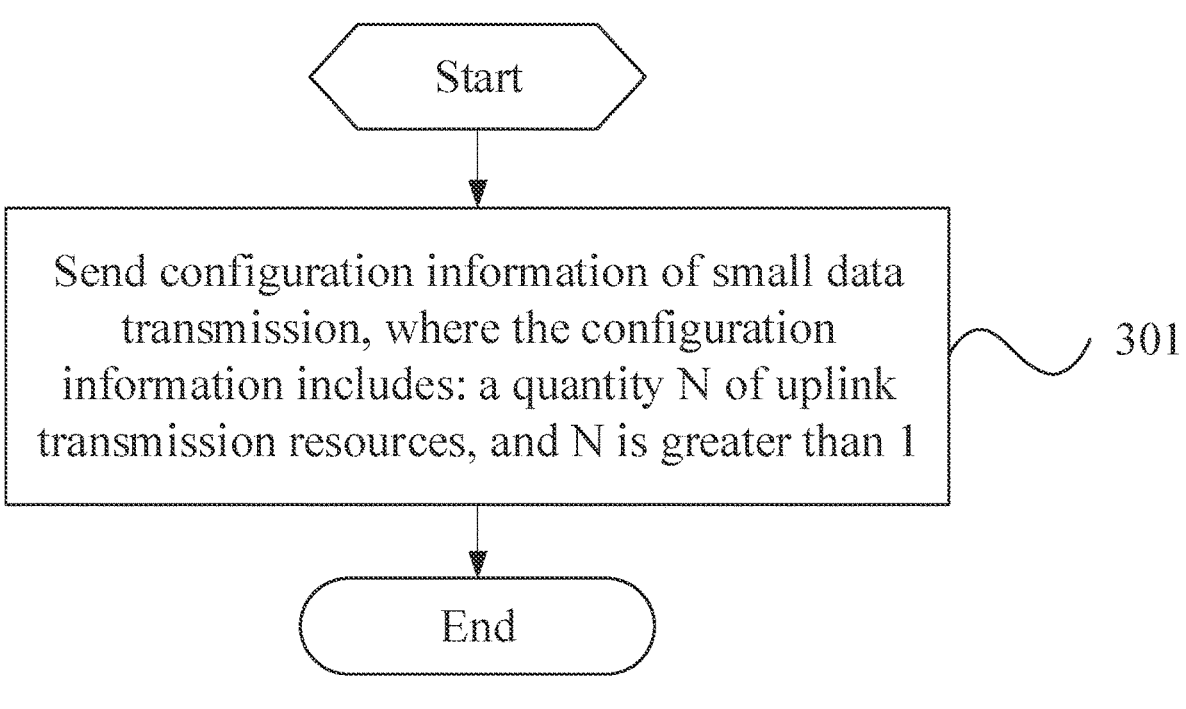
FIG. 3 is a flowchart of a method applied to a network side device according to an embodiment of this application.

As shown in FIG. 3, an embodiment of this application further provides a data transmission processing method. The method is applied to a network side device and includes the following steps.

Step 301. Send configuration information of small data transmission, where the configuration information includes: a quantity N of uplink transmission resources, and N is greater than 1.

The network side device to which the method is applied configures and sends the configuration information of small data transmission to the terminal, so that after the terminal obtains the configuration information of small data transmission, the small data transmission can be triggered or not triggered based on the quantity N of uplink transmission resources in the configuration information. However, because N is greater than 1, the small data transmission may be performed by using a plurality of uplink transmission resources, thus supporting a larger data transmission amount, meeting data transmission requirements, and reducing the data transmission delay.

In some implementations, the configuration information further includes:

a data amount threshold corresponding to N uplink transmission resources, where the data amount threshold is a total data amount allowed to be transmitted by using the N uplink transmission resources, and/or a data amount allowed to be transmitted by using each of the N uplink transmission resources.

It should be noted that this method is used in combination with the foregoing method applied to a terminal, to realize small data transmission. The implementation manner of the embodiment of the foregoing method applied to a terminal is applicable to this method, and a same technical effect can be achieved.

It should be noted that, in the data transmission processing method provided in the embodiments of this application, an execution body may be a data transmission processing apparatus, or a control module in the data transmission processing apparatus configured to execute and load the data transmission processing method. In this embodiment of this application, an example in which the data transmission processing apparatus executes and loads the data transmission processing method is used as an example, to describe the data transmission processing method provided in the embodiments of this application.

Figure 4:
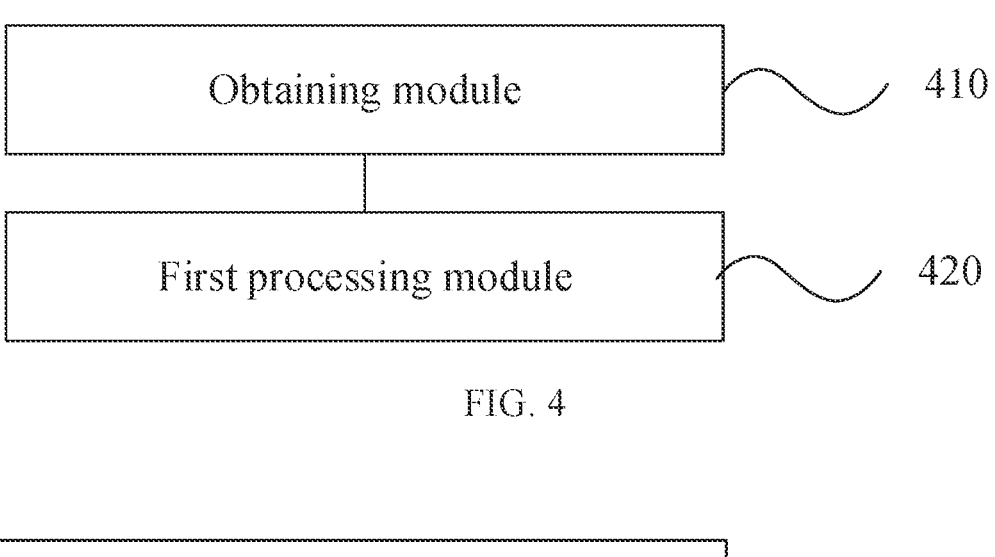
FIG. 4 is a structural diagram of an apparatus corresponding to a method in FIG. 2.

As shown in FIG. 4, an embodiment of this application provides a data transmission processing apparatus, including:

an obtaining module 410, configured to obtain configuration information for small data transmission, where the configuration information includes: a quantity N of uplink transmission resources, and N is greater than 1; and a first processing module 420, configured to determine whether to trigger small data transmission based on the configuration information.

In some implementations, the configuration information further includes:

a data amount threshold corresponding to N uplink transmission resources, where the data amount threshold is a total data amount allowed to be transmitted by using the N uplink transmission resources, and/or a data amount allowed to be transmitted by using each of the N uplink transmission resources.

In some implementations, the first processing module is further configured to:

determine whether first data meets a first preset condition based on the configuration information, and trigger small data transmission in a case of meeting the first preset condition; not trigger small data transmission in a case of not meeting the first preset condition, where the first data is target data of this small data transmission; and the first preset condition includes at least one of the following:

a quantity M of uplink transmission resources used for the first data is less than or equal to N;

a total data amount of the first data is less than or equal to the total data amount allowed to be transmitted by using the N uplink transmission resources; and in the M uplink transmission resources used for the first data, a data amount of each uplink transmission resource is less than or equal to the data amount allowed to be transmitted by using each of the N uplink transmission resources.

In some implementations, the first data includes data transmitted in segments on the M uplink transmission resources, and/or data not transmitted in segments on the M uplink transmission resources.

In some implementations, the total data amount of the first data includes valid data, or the valid data and at least one of the following:

a header of original data;

a header of segmented data; and control signaling.

In some implementations, in the M uplink transmission resources used for the first data, a data amount of each uplink transmission resource includes valid data, or the valid data and at least one of the following:

a header of original data;

a header of segmented data; and control signaling.

In some implementations, the header includes at least one of the following:

a Service Data Adaptation Protocol (SDAP) header;

a Packet Data Convergence Protocol (PDCP) header;

a Radio Link Control (RLC) header; and a Media Access Control (MAC) header.

In some implementations, the control signaling includes at least one of the following:

a Buffer Status Report (BSR); and a Power Headroom Report (PHR).

In some implementations, the apparatus further includes:

a second processing module, configured to: in a case of new data to be transmitted, determine whether second data meets a second preset condition, and in a case that the second preset condition is met, continue small data transmission; in a case that the second preset condition is not met, perform at least one of the following:

stopping small data transmission after the first data is transmitted; and triggering connection establishment or recovery, where the second preset condition includes at least one of the following:

a quantity K of uplink transmission resources used for the second data is less than or equal to N;

a total data amount of the second data is less than or equal to the total data amount allowed to be transmitted by using the N uplink transmission resources; and in the K uplink transmission resources used for the second data, a data amount of each uplink transmission resource is less than or equal to the data amount allowed to be transmitted by using each of the N uplink transmission resources.

In some implementations, the second data is the first data and the new data; or the second data is remaining data not transmitted in the first data and the new data.

After obtaining the configuration information of small data transmission, the apparatus can trigger or not trigger the small data transmission based on the quantity N of uplink transmission resources in the configuration information. However, because N is greater than 1, the small data transmission may be performed by using a plurality of uplink transmission resources, thus supporting a larger data transmission amount, meeting data transmission requirements, and reducing the data transmission delay.

The data transmission processing apparatus in this embodiment of this application may be an apparatus, or a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, an in-vehicle device, a wearable device, an Ultra-Mobile Personal Computer (UMPC), a netbook, a Personal Digital Assistant (PDA), or the like. The non-mobile electronic device may be a server, a Network Attached Storage (NAS) device, a personal computer, a television, a teller machine, a self-service machine, or the like. This is not specifically limited in the embodiments of this application.

The data transmission processing apparatus in this embodiment of this application may be an apparatus with an operating system. The operating system may be an Android operating system, may be an iOS operating system, or may be another possible operating system. This is not specifically limited in this embodiment of this application.

The data transmission processing apparatus provided in this embodiment of this application can implement each process implemented by the terminal in the method embodiment of FIG. 2. To avoid repetition, details are not described herein again.

Figure 5:
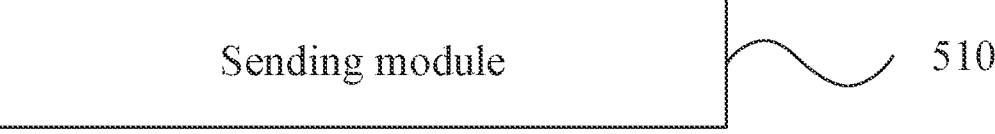
FIG. 5 is a structural diagram of an apparatus corresponding to a method in FIG. 3.

As shown in FIG. 5, an embodiment of this application further provides a data transmission processing apparatus, including:

a sending module 510, configured to send configuration information of small data transmission, where the configuration information includes: a quantity N of uplink transmission resources, and N is greater than 1.

In some implementations, the configuration information further includes:

a data amount threshold corresponding to N uplink transmission resources, where the data amount threshold is a total data amount allowed to be transmitted by using the N uplink transmission resources, and/or a data amount allowed to be transmitted by using each of the N uplink transmission resources.

The apparatus configures and sends the configuration information of small data transmission to the terminal, so that after the terminal obtains the configuration information of small data transmission, the small data transmission can be triggered or not triggered based on the quantity N of uplink transmission resources in the configuration information. However, because N is greater than 1, the small data transmission may be performed by using a plurality of uplink transmission resources, thus supporting a larger data transmission amount, meeting data transmission requirements, and reducing the data transmission delay.

The data transmission processing apparatus provided in this embodiment of this application can implement each process implemented by the network side device in the method embodiment of FIG. 3. To avoid repetition, details are not described herein again.

Figure 6:
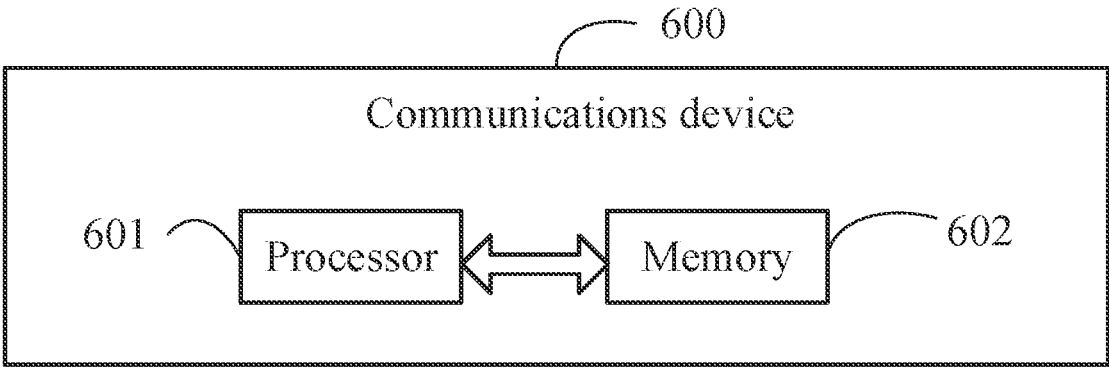
FIG. 6 is a structural diagram of a communications device according to an embodiment of this application.

In some implementations, as shown in FIG. 6, an embodiment of this application further provides a communications device, including a processor 601, a memory 602, a program or an instruction stored in the memory 602 and executable on the processor 601. For example, when the communications device 600 is a terminal, the program or the instruction is executed by the processor 601 to implement processes of the embodiment of the foregoing data transmission processing method applied to the terminal, and a same technical effect can be achieved. When the communications device 600 is a network side device, the program or the instruction is executed by the processor 601 to implement processes of the embodiment of the foregoing data transmission processing method applied to the network side device, and a same technical effect can be achieved. To avoid repetition, details are not described herein again.

Figure 7:
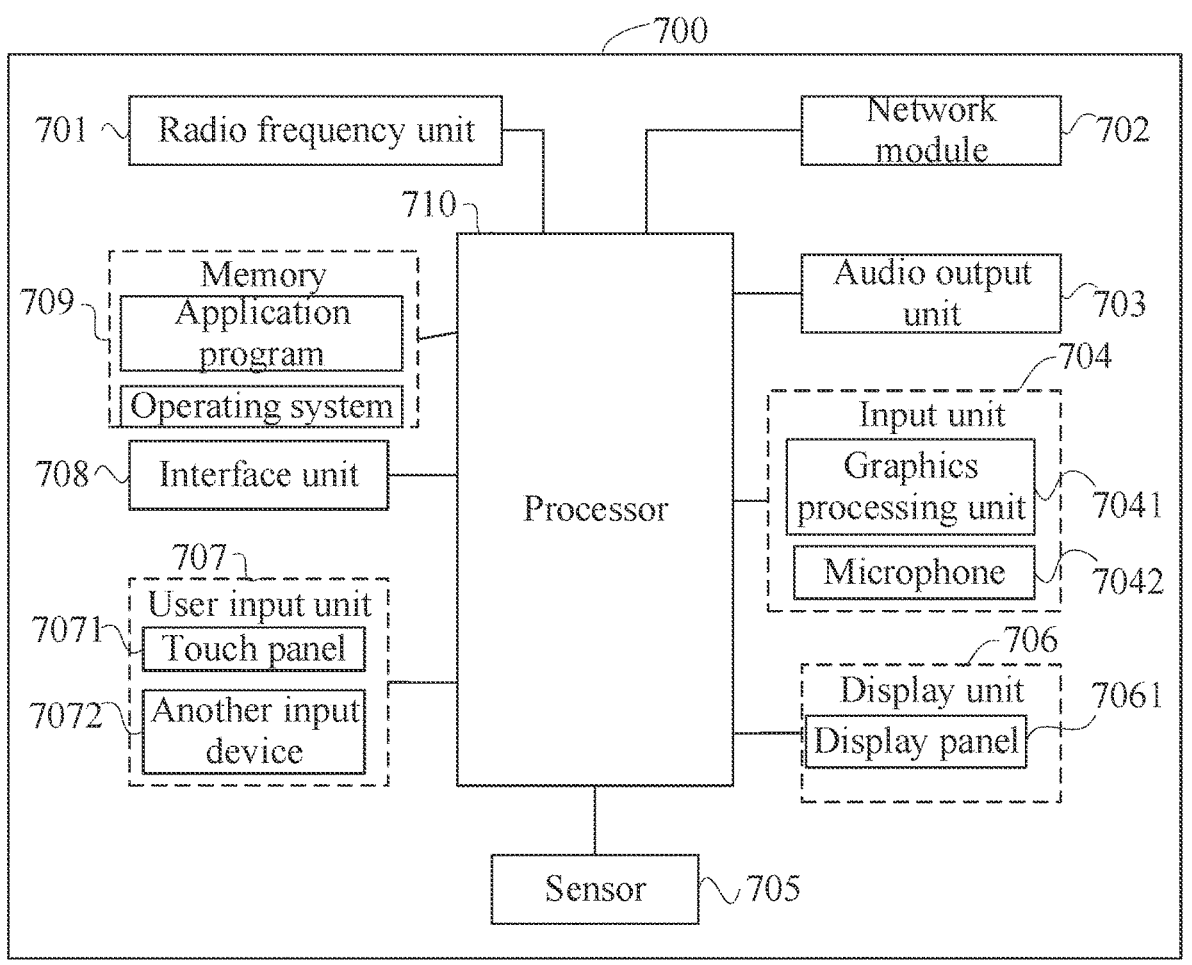
FIG. 7 is a structural diagram of a terminal according to an embodiment of this application.

FIG. 7 is a schematic diagram of a hardware structure of a terminal for implementing the embodiments of this application.

The terminal 700 includes but is not limited to components such as a radio frequency unit 701, a network module 702, an audio output unit 703, an input unit 704, a sensor 705, a display unit 706, a user input unit 707, an interface unit 708, a memory 709, and a processor 710.

It may be understood by a person skilled in the art that the terminal 700 may further include a power supply (such as a battery) that supplies power to each component. The power supply may be logically connected to the processor 710 by using a power management system, to implement functions such as charging, discharging, and power consumption management by using the power management system. The terminal structure shown in FIG. 7 constitutes no limitation on the terminal, and the terminal may include more or fewer components than those shown in the figure, or combine some components, or have different component arrangements. Details are not described herein.

It should be understood that, in this embodiment of this application, the input unit 704 may include a Graphics Processing Unit (GPU) 7041 and a microphone 7042. The graphics processing unit 7041 processes image data of a static picture or a video obtained by an image capture apparatus (such as a camera) in a video capture mode or an image capture mode. The display unit 706 may include a display panel 7061, and the display panel 7061 may be configured in a form of a liquid crystal display, an organic light-emitting diode, or the like. The user input unit 707 includes a touch panel 7071 and another input device 7072. The touch panel 7071 is also referred to as a touchscreen. The touch panel 7071 may include two parts: a touch detection apparatus and a touch controller. The another input device 7072 may include but is not limited to a physical keyboard, a functional button (such as a volume control button or a power on/off button), a trackball, a mouse, and a joystick. Details are not described herein.

In this embodiment of this application, the radio frequency unit 701 receives downlink data from a network side device and then sends the downlink data to the processor 710 for processing; and sends uplink data to the network side device. Usually, the radio frequency unit 701 includes but is not limited to an antenna, at least one amplifier, a transceiver, a coupler, a low noise amplifier, a duplexer, and the like.

The memory 709 may be configured to store a software program or an instruction and various data. The memory 709 may mainly include a program or instruction storage area and a data storage area. The program or instruction storage area may store an operating system, and an application program or an instruction required by at least one function (for example, a sound playing function or an image playing function). In addition, the memory 709 may include a high-speed random access memory, and may further include a non-volatile memory. The non-volatile memory may be a Read-Only Memory (ROM), a Programmable ROM (PROM), an Erasable PROM (EPROM), an Electrically EPROM (EEPROM), or a flash memory, For example, at least one disk storage component, a flash memory component, or another non-volatile solid-state storage component.

The processor 710 may include one or more processing units. In some implementations, an application processor and a modem processor may be integrated into the processor 710. The application processor mainly processes an operating system, a user interface, an application program, an instruction, or the like. The modem processor mainly processes wireless communications, for example, a baseband processor. It can be understood that, alternatively, the modem processor may not be integrated into the processor 710.

The processor 710 is configured to: obtain configuration information for small data transmission, where the configuration information includes: a quantity N of uplink transmission resources, and N is greater than 1; and determine whether to trigger small data transmission based on the configuration information.

After obtaining the configuration information of small data transmission, the terminal can trigger or not trigger the small data transmission based on the quantity N of uplink transmission resources in the configuration information. However, because N is greater than 1, the small data transmission may be performed by using a plurality of uplink transmission resources, thus supporting a larger data transmission amount, meeting data transmission requirements, and reducing the data transmission delay.

Figure 8:
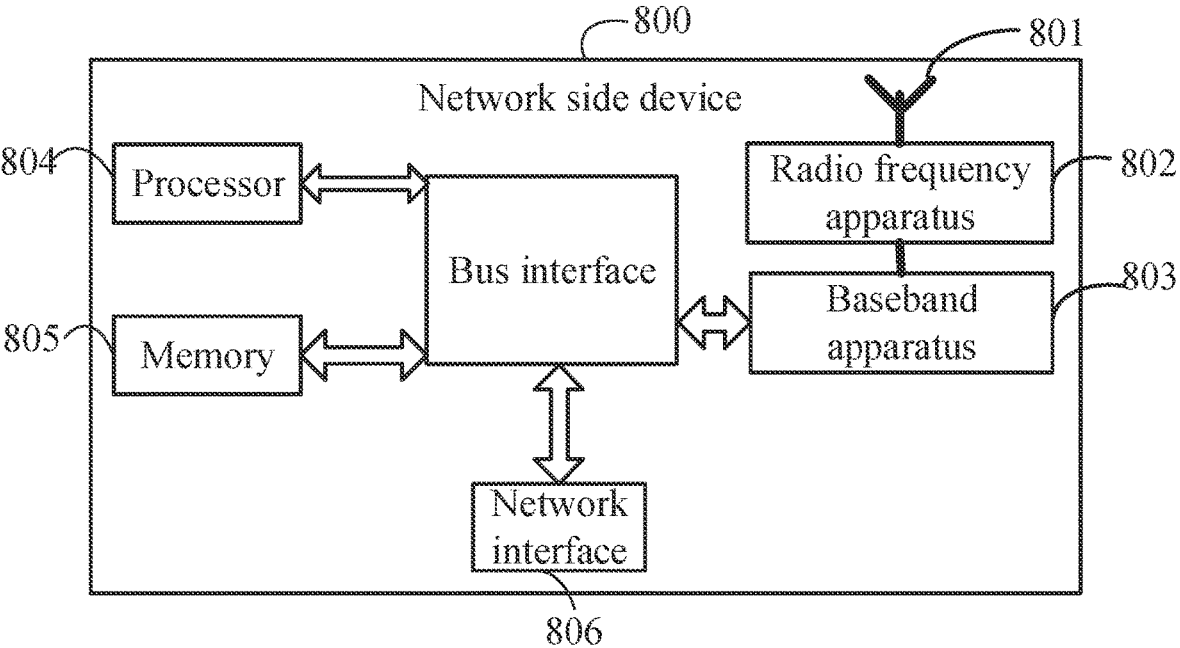
FIG. 8 is a structural diagram of a network side device according to an embodiment of this application.

In some implementations, an embodiment of this application further provides a network side device. As shown in FIG. 8, the network device 800 includes an antenna 801, a radio frequency apparatus 802, and a baseband apparatus 803. The antenna 801 is connected to the radio frequency apparatus 802. In an uplink direction, the radio frequency apparatus 802 receives information by using the antenna 801, and sends the received information to the baseband apparatus 803 for processing. In a downlink direction, the baseband apparatus 803 processes to-be-sent information, and sends the to-be-sent information to the radio frequency apparatus 802. After processing the received information, the radio frequency apparatus 802 sends the information by using the antenna 801.

The frequency band processing apparatus may be located in the baseband apparatus 803. The method performed by the network-side device in the foregoing embodiment may be implemented in the baseband apparatus 803. The baseband apparatus 803 includes a processor 804 and a memory 805.

The baseband apparatus 803 may include, for example, at least one baseband board, where a plurality of chips are disposed on the baseband board. As shown in FIG. 8, one chip is, for example, the processor 804, which is connected to the memory 805, so as to invoke a program in the memory 805 to perform operations of the network device shown in the above method embodiment.

The baseband apparatus 803 may further include a network interface 806, configured to exchange information with the radio frequency apparatus 802, where the interface is, for example, a Common Public Radio Interface (CPRI).

In some implementations, the network side device in this embodiment of the present invention further includes an instruction or a program stored in the memory 805 and executable by the processor 804. The processor 804 invokes the instruction or the program in the memory 805 to perform the method performed by the modules shown in FIG. 3, and a same technical effect can be achieved. To avoid repetition, details are not described herein again.

An embodiment of this application further provides a readable storage medium, where the readable storage medium stores a program or an instruction, and when the program or the instruction is executed by a processor, the processes of the embodiment of the foregoing data transmission processing method applied to the terminal or the processes of the embodiment of the foregoing data transmission processing method applied to the network side device are implemented, and a same technical effect can be achieved. To avoid repetition, details are not described herein again.

The processor is a processor in the electronic device in the foregoing embodiment. The readable storage medium includes a computer-readable storage medium such as a Read-Only Memory (ROM), a Random Access Memory (RAM), a magnetic disk, an optical disc, or the like.

An embodiment of this application still provides a chip. The chip includes a processor and a communications interface, and the communications interface is coupled to the processor. The processor is configured to run a program or an instruction, to implement the processes of the embodiment of the foregoing data transmission processing method applied to the terminal or the processes of the embodiment of the foregoing data transmission processing method applied to the network side device, and a same technical effect can be achieved. To avoid repetition, details are not described herein again.

It should be understood that the chip mentioned in this embodiment of this application may also be referred to as a system-level chip, a system chip, a system on chip, an on-chip system chip, and the like.

It should be noted that, in this specification, the terms "include," "comprise," or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In the absence of more restrictions, an element defined by the statement "including a . . . " does not preclude the presence of other identical elements in the process, method, article, or apparatus that includes the element. In addition, it should be noted that the scope of the methods and apparatuses in the embodiments of this application is not limited to performing functions in the order shown or discussed, but may also include performing the functions in a basically simultaneous manner or in opposite order based on the functions involved. For example, the described methods may be performed in a different order from the described order, and various steps may be added, omitted, or combined. In addition, features described with reference to some examples may be combined in other examples.

Based on the descriptions of the foregoing implementations, a person skilled in the art may understand that the method in the foregoing embodiment may be implemented by software in addition to a necessary universal hardware platform or by hardware only. In most circumstances, the former is a preferred implementation. Based on such understanding, the technical solutions of this application essentially, or the part contributing to the prior art may be implemented in a form of a software product. The computer software product is stored in a storage medium (for example, a ROM/RAM, a magnetic disk, or a compact disc), and includes several instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the foregoing specific implementations. The foregoing specific implementations are merely schematic instead of restrictive. Under enlightenment of this application, a person of ordinary skills in the art may make many forms without departing from aims and the protection scope of claims of this application, all of which fall within the protection scope of this application.

The invention claimed is:

1. A data transmission processing method, performed by a terminal, wherein the method comprises:

obtaining configuration information for a small data transmission, wherein the configuration information comprises: a data amount threshold corresponding to N uplink transmission resources, and N is an integer greater than 1, and the data amount threshold is a total data amount allowed to be transmitted by using the N uplink transmission resources;

determining whether to trigger the small data transmission comprising determining whether first data meets a first preset condition based on the configuration information, wherein the first data is target data of the small data transmission; and triggering the small data transmission when the first preset condition is met, or not triggering the small data transmission when the first preset condition is not met, wherein the first preset condition comprises:

a total data amount of the first data is less than or equal to the data amount threshold.

2. The method according to claim 1, wherein the configuration information further comprises:

a quantity N of uplink transmission resources.

3. The method according to claim 2, wherein the first preset condition further comprises:

a quantity M of uplink transmission resources used for the first data is less than or equal to N.

4. The method according to claim 3, wherein the first data comprises data transmitted in segments on the M uplink transmission resources, or data not transmitted in segments on the M uplink transmission resources.

5. The method according to claim 1, wherein the total data amount of the first data comprises valid data, or the valid data and at least one of the following:

a header of original data;

a header of segmented data; or control signaling.

6. The method according to claim 5, wherein the header comprises at least one of the following:

a Service Data Adaptation Protocol (SDAP) header;

a Packet Data Convergence Protocol (PDCP) header;

a Radio Link Control (RLC) header; or a Media Access Control (MAC) header.

7. The method according to claim 5, wherein the control signaling comprises at least one of the following:

a Buffer Status Report (BSR); or a Power Headroom Report (PHR).

8. The method according to claim 1, wherein after the determining whether to trigger the small data transmission based on the configuration information, the method further comprises:

when new data is to be transmitted, determining whether second data meets a second preset condition;

when the second preset condition is met, continuing the small data transmission; and when the second preset condition is not met, performing at least one of the following:

stopping the small data transmission after the first data is transmitted; or triggering connection establishment or recovery, wherein the second preset condition comprises at least one of the following:

a quantity K of uplink transmission resources used for the second data is less than or equal to N;

a total data amount of the second data is less than or equal to the total data amount allowed to be transmitted by using the N uplink transmission resources; or in the K uplink transmission resources used for the second data, a data amount of each uplink transmission resource is less than or equal to each data amount allowed to be transmitted by using each of the N uplink transmission resources.

9. The method according to claim 8, wherein the second data is the first data and the new data; or the second data is remaining data not transmitted in the first data and the new data.

10. A data transmission processing method, performed by a network side device, wherein the method comprises:

sending configuration information of a small data transmission, wherein the configuration information comprises: a data amount threshold corresponding to N uplink transmission resources, wherein the data amount threshold is a total data amount allowed to be transmitted by using the N uplink transmission resources, and N is an integer greater than 1, wherein the small data transmission is triggered when a first preset condition is met or not triggered when the first preset condition is not met, wherein the first preset condition comprises:

a total data amount of a first data which is target data of the small data transmission is less than or equal to the data amount threshold.

11. The method according to claim 10, wherein the configuration information further comprises:

a quantity N of uplink transmission resources.

12. A terminal, comprising:

a memory storing computer-readable instructions; and a processor coupled to the memory and configured to execute the computer-readable instructions, wherein the computer-readable instructions, when executed by the processor, cause the processor to perform operations comprising:

obtaining configuration information for a small data transmission, wherein the configuration information comprises: a data amount threshold corresponding to N uplink transmission resources, wherein the data amount threshold is a total data amount allowed to be transmitted by using the N uplink transmission resources, and N is an integer greater than 1;

determining whether to trigger the small data transmission comprising determining whether first data meets a first preset condition based on the configuration information, wherein the first data is target data of the small data transmission; and triggering the small data transmission when the first preset condition is met, or not triggering the small data transmission when the first preset condition is not met, wherein the first preset condition comprises:

a total data amount of the first data is less than or equal to the data amount threshold.

13. The terminal according to claim 12, wherein the configuration information further comprises:

a quantity N of uplink transmission resources.

14. The terminal according to claim 13, wherein the first preset condition further comprises:

a quantity M of uplink transmission resources used for the first data is less than or equal to N.

15. The terminal according to claim 14, wherein the first data comprises data transmitted in segments on the M uplink transmission resources, or data not transmitted in segments on the M uplink transmission resources.

16. The terminal according to claim 12, wherein the total data amount of the first data comprises valid data, or the valid data and at least one of the following:

a header of original data;

a header of segmented data; or control signaling.

17. The terminal according to claim 12, wherein after the determining whether to trigger the small data transmission based on the configuration information, the operations further comprise:

when new data is to be transmitted, determining whether second data meets a second preset condition;

when the second preset condition is met, continuing the small data transmission; and when the second preset condition is not met, performing at least one of the following:

stopping the small data transmission after the first data is transmitted; or triggering connection establishment or recovery, wherein the second preset condition comprises at least one of the following:

a quantity K of uplink transmission resources used for the second data is less than or equal to N;

a total data amount of the second data is less than or equal to the total data amount allowed to be transmitted by using the N uplink transmission resources; or in the K uplink transmission resources used for the second data, a data amount of each uplink transmission resource is less than or equal to each data amount allowed to be transmitted by using each of the N uplink transmission resources.

18. The terminal according to claim 17, wherein the second data is the first data and the new data; or the second data is remaining data not transmitted in the first data and the new data.

\* \* \* \* \*